M. WENGER.
SHAFT BEARING.
APPLICATION FILED JAN. 7, 1910.
1,001,486.
Patented Aug. 22, 1911.
2 SHEETS—SHEET 2.
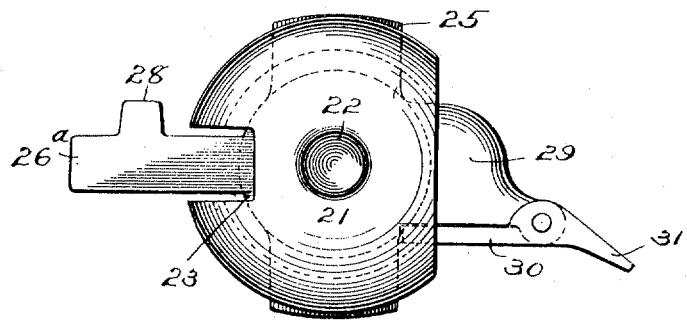
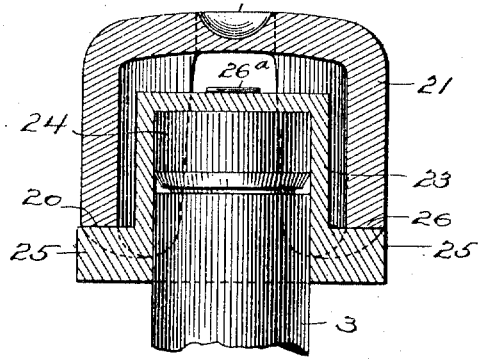
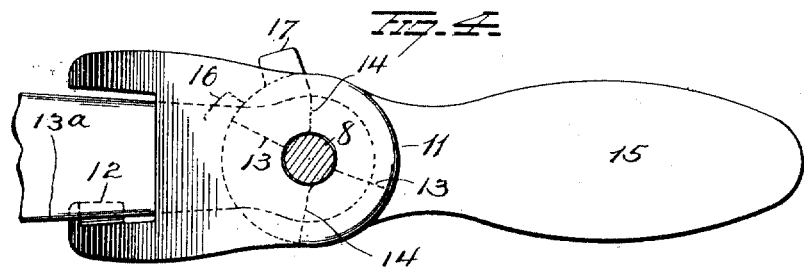
WITNESSES
E. J. Nottingham
G. F. Downing
INVENTOR
M. Wenger
By H. A. Seymour
Attorney

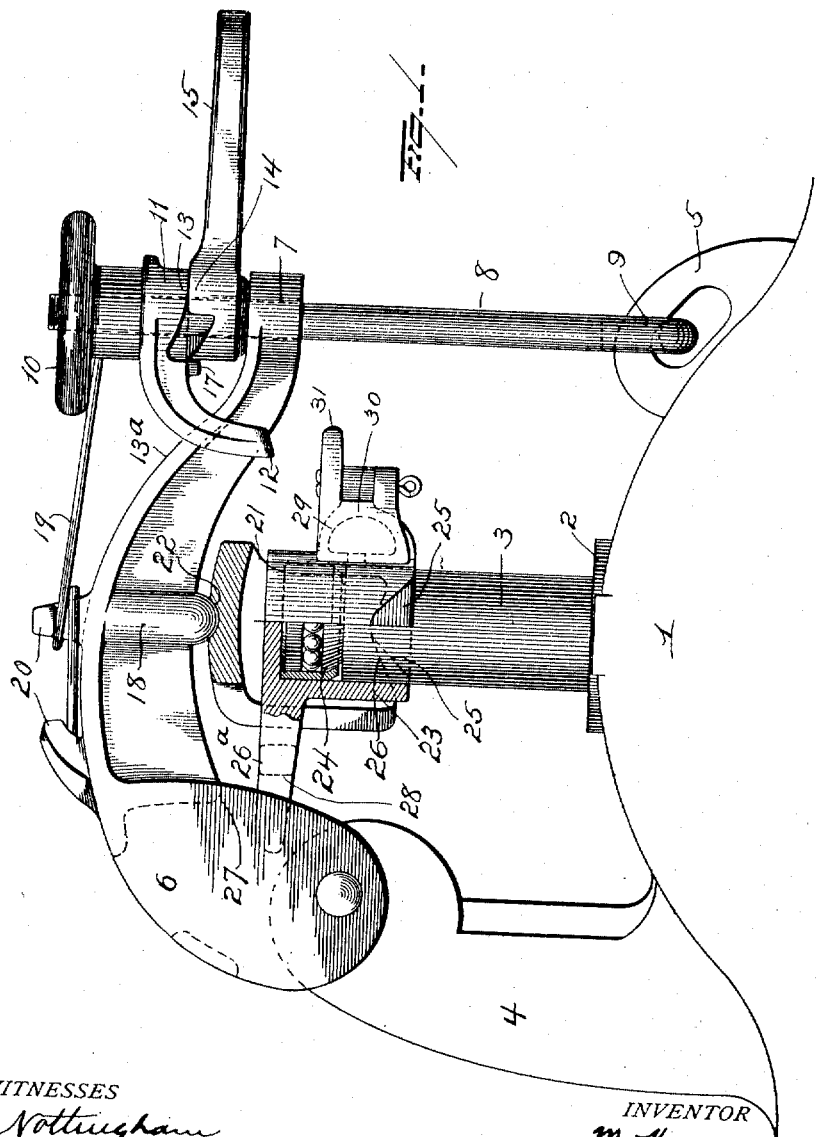

UNITED STATES PATENT OFFICE.

MILTON WENGER, OF NEW HOLLAND, PENNSYLVANIA.

SHAFT-BEARING.

1,001,486.     Specification of Letters Patent.     Patented Aug. 22, 1911.

Application filed January 7, 1910. Serial No. 536,933.

*To all whom it may concern:*

Be it known that I, MILTON WENGER, of New Holland, in the county of Lancaster and State of Pennsylvania, have invented certain new and useful Improvements in Shaft-Bearings; and I do hereby declare the following to be a full, clear, and exact description of the invention, such as will enable others skilled in the art to which it appertains to make and use the same.

This invention relates to improvements in shaft bearings and more particularly to an improved thrust bearing construction.

It has been heretofore proposed in the construction of a thrust bearing to provide a thrust box for the reception of the end of the shaft and to cause a lever to bear against the end of such box to press the ball bearings therein toward the end of the shaft, and in some instances adjusting screws have been provided to bear against the end of the thrust box for a similar purpose. With such construction, should the position of the thrust lever vary from a right angle to the axis of the shaft, or should the adjusting screw not bear against the thrust box in exact alinement with the axis of the shaft, more or less side pressure will result and cause side wear in the box and ruin to the anti-friction bearings.

The object of my invention is to obviate the defects of prior constructions as above enumerated and to construct a thrust bearing in such manner that it will be pulled rather than pushed toward the end of the shaft.

A further object is to provide simple and efficient means for adjusting the thrust bearing with relation to the end of the shaft.

With these objects in view the invention consists in certain novel features of construction and combinations of parts as hereinafter set forth and pointed out in the claims.

In the accompanying drawings, Figure 1 is a view in elevation, partly broken away, illustrating a thrust bearing construction embodying my invention. Figs. 2, 3 and 4 are detail views.

1 represents a suitable support having a bearing 2 for a shaft 3 and provided at respective sides of said bearing with a standard or arm 4 and a perforated lug 5.

One end of a thrust lever 6 is pivotally attached to the arm or standard 4 and provided at its free end with a hole 7 for the passage of a rod 8, the latter being provided at its lower end with a hook 9 to engage the perforated lug 5 on the support 1. The upper portion of the rod 8 is threaded for the reception of a hand wheel or nut 10. A yoke 11 is provided with a hole for the free passage of the threaded portion of rod 8 and the arms of this yoke are made at their free ends with lugs 12 adapted to engage flanges 13ᵃ on the lever 6. The under face of the yoke 11 is provided in proximity to the rod 8 with a cam 13 to coöperate with a cam 14 on the upper face of a hand-lever 15, the latter being provided with a hole for the passage of the rod 8. The hand-lever 15 is also provided with a lug 16 which coöperates with a shoulder 17 on the yoke 11 to limit the movement of the lever 15 in one direction. The lever 6 is provided at a point between its ends with a lug or depending projection 18 to bear against the thrust bearing devices hereinafter described. By moving the lever 15 in a direction to release the engagement of the yoke 11 with the lever 6, the hand wheel or nut 10 can be turned so as to move it up or down on the rod 8 and when properly adjusted, the hand-lever 15 will be moved to the position shown in Fig. 1 when the lever 6 will be secured in position and caused to exert proper pressure on the thrust bearing devices. To compensate for wear the lever and yoke construction may be loosened as above described; the wheel or nut screwed farther down on the rod 8 and a lever and yoke devices returned to the position shown in Fig. 1. In order to prevent the wheel or nut 10 from accidentally turning, a spring rod or wire 19 may be employed and connected with lugs 20 on the lever 6.

A yoke or sleeve 21 is provided at one end with a socket 22 for the accommodation of the depending lug 18 on the lever 6 and this yoke or sleeve receives a thrust box 23 within which an anti-friction bearing 24 is located. The thrust box 23 is provided at diametrically opposite sides with embedded V-shaped lugs 25 bearing in similarly shaped recesses 26 at the lower ends of diametrically opposite sides of the yoke 21. The thrust box is also provided with a lateral arm 26ᵃ which projects beyond the yoke 21 and enters a groove or recess 27 in proximity to the pivoted end of the lever 6. The arm 26ᵃ is preferably provided with a lug 28 disposed between the lever 6 and the yoke 21.

A lubricant box or cup 29 is formed on one side of the thrust box and made to communicate with the latter,—said lubricant cup being provided with a hinged cover 30 having an operating arm or lip 31.

When the shaft 3 is inserted into the thrust box or the latter is placed over the end of the shaft, the lugs 25 will be disposed an appreciable distance from the end of said shaft which engages the anti-friction bearing within the thrust box. It will therefore be seen that when pressure is applied to the yoke 21, such pressure will be transmitted by said yoke to the lugs 25 at the end of the thrust box farthest removed from the anti-friction bearing and that therefore the anti-friction bearing will be pulled against the end of the shaft and will be maintained always in proper relation to the latter.

Having fully described my invention what I claim as new and desire to secure by Letters-Patent, is,—

1. The combination with a lever, of a thrust box provided at its inner end with lugs, an anti-friction bearing within the outer portion of said thrust box, and a yoke embracing the thrust box and bearing at one end against said lever and at the other end against the lugs on the thrust box.

2. The combination with a thrust box provided at diametrically opposite sides with lugs and adapted to receive the end portion of a shaft, and an anti-friction bearing within the forward portion of said thrust box, of a yoke embracing the thrust box and bearing against the lugs thereon, a pivoted lever engaging the opposite end of said yoke, and means for adjustably connecting the free end of said pivoted lever with a support.

3. The combination with a thrust bearing and a support, of a lever pivoted to said support at one side of the thrust bearing, a rod depending from the free end of said lever and engaging said support, means between the ends of the lever for transmitting pressure of the latter to the thrust bearing, a yoke engaging the lever and provided with an opening for the passage of said rod, said yoke having a cam, a cam lever mounted loosely on the rod between the yoke and the free end of the first mentioned lever, and an adjusting nut on the upper portion of said rod.

4. The combination with a pivoted lever having a recess near its pivoted end and means for connecting the free end of said lever with a fixed part, of a yoke bearing against an intermediate portion of said lever, a thrust box within said yoke and provided with lugs engaging the end of the latter farthest removed from the lever, an anti-friction bearing within said thrust box, and an arm projecting from said thrust box and entering the recess near the pivoted end of the lever.

In testimony whereof, I have signed this specification in the presence of two subscribing witnesses.

MILTON WENGER.

Witnesses:
J. W. SHOWALTER,
J. A. HOFFMANN.

---

Copies of this patent may be obtained for five cents each, by addressing the "Commissioner of Patents, Washington, D. C."